Patented Apr. 11, 1933

1,903,470

UNITED STATES PATENT OFFICE

FRITZ MIETZSCH AND HEINRICH KLÖS, OF ELBERFELD, GERMANY, ASSIGNORS TO WINTHROP CHEMICAL COMPANY, INC., OF NEW YORK, N. Y., A CORPORATION OF NEW YORK

PROCESS OF MAKING 8-HYDROXYQUINOLINE COMPOUNDS

No Drawing. Application filed July 11, 1928, Serial No. 292,015, and in Germany September 18, 1926.

The present invention concerns a process for the manufacture of 8-hydroxy-quinoline and its derivatives, e. g. the 5.6- or 7-methyl- and 5.6- or 7-halogen-8-hydroxyquinoline or the hitherto unknown 6.8-dihydroxyquinoline. The process for their production consists in heating an 8-aminoquinoline of the general formula

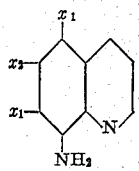

wherein $x_1$ means H, alkyl, halogen, and $x_2$ means H, alkyl, halogen, hydroxyl, alkoxy, and wherein at least two of the symbols $x_1$, $x_1$, $x_2$ represent hydrogen advantageously in aqueous or aqueous alcoholic solution in the presence of a reagent exerting an acid reaction in an autoclave at temperatures of above 150° C. (inner temperature). The best results are obtained at a temperature of about 180–190° C. (inner temperature).

The invention is generally applicable to derivatives of the 8-aminoquinoline and the process can be carried out technically in the most simple manner, the yields being highly satisfactory; from amongst the acid reagents, mineral acids such as dilute non-sulfonating sulfuric acid, hydrochloric acid and hydrobromic acid or zinc chloride may be mentioned.

The new process has been shown to be especially suitable for the manufacture of 6.8-dihydroxy quinoline, since, 6-hydroxy-8-aminoquinoline as well as its oxygen ethers can be subjected to the acid treatment, in which latter case substitution of the amino group by hydroxyl and saponification of the alkoxy group take place.

The following examples illustrate the principles underlying our invention, which is, of course, not restricted thereto:

*Example 1.*—216 parts by weight of 8-amino-quinoline are poured while stirring into a mixture of 880 parts by weight of water and 660 parts by weight of sulfuric acid of 66° Bé., while still hot and the whole is then heated in a lead autoclave for about 8 hours to 225° C. (bath temperature corresponding to 180°–190° C. inner temperature), 8-hydroxy-quinoline is obtained practically in quantitative yield and without by-products by simple neutralization with potassium carbonate.

*Example 2.*—261 parts by weight of 6-methoxy-8-amino-quinoline are heated to about 180–190° (inner temperature) for about 8 hours with 880 parts by weight of water and 660 parts by weight of sulfuric acid of 66° Bé. 6.8-dihydroxy quinoline sulfate is obtained, which possesses a lemon yellow coloration and is difficulty soluble in water and sulfuric acid. It is filtered off from the mother liquor and again stirred into about 3 liters of water at 70° C. and decomposed whilst hot with potassium bicarbonate or potasium carbonate, when the free dihydroxy quinoline separates out; at times this appears first as an oil, but on further stirring crystals separate as a sandy mass. The dihydroxy quinoline distils (with sublimation to a small extent) as a deep red liquid at 207° C., under 16 mm. pressure and solidifies as almost colorless crystals melting at 153° C. It dissolves without coloration in solvents which do not dissociate, such as benzene, ether and the like, but with a yellow coloration in water, alcohol and acetone. When the crystallized dihydroxy quinoline sulfate alone is worked up the yield amounts to about 80 percent of the theory, and taking into account the residues contained in the mother liquor the yield is practically quantitative.

*Example 3.*—240 parts by weight of 6-hydroxy-8-amino-quinoline, (colorless crystals melting at 177° C.), obtained for example by boiling 6-methoxy-8-amino-quinoline for 8 hours with five times its weight of hydrobromic acid of specific gravity 1.7, yield 6.8-dihydroxy-quinoline of similar purity and yield by following the directions of the treatment of Example 2 and subsequent working up as indicated.

*Example 4.*—17.4 parts by weight of 6-methoxy-8-amino-quinoline are dissolved in 40 parts by weight of alcohol and a solution of 13.7 parts by weight of zinc chloride in 50 parts by weight of water is stirred in. A thick white precipitate of the double compound is formed, which is heated in a similar manner to that above described. The contents of the autoclave are dissolved in boiling water and the dihydroxy quinoline and zinc carbonate are precipitated with potassium carbonate; the former is extracted with alcohol. On standing or by the addition of a little water dihydroxy quinoline crystallizes from the alcoholic solution in long faintly red colored needles of the melting point 153° C.

*Example 5.*—Instead of working with an excess of mineral acid, it suffices to heat the monohydrochloride of 6-methoxy-8-aminoquinoline to 220° (bath temperature) in aqueous solution. The isolation is carried out analogously to that of Example 1.

This is a continuation in part application of our application Serial No. 217,017, filed September 1, 1927.

We claim:

1. The process which comprises heating an 8-amino-quinoline of the general formula

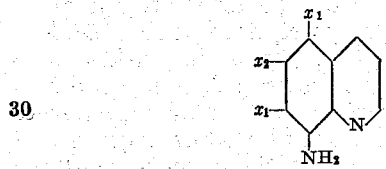

wherein the $x_1$ means H, alkyl, halogen, and $x_2$ means H, alkyl, halogen, hydroxyl, alkoxy, and wherein at least two of the symbols $x_1$, $x_1$, $x_2$ represent hydrogen, in an aqueous solution in the presence of an acid reacting agent of the group consisting of dilute non-sulfonating sulfuric acid, hydrochloric acid, hydrobromic acid and zinc chloride in an autoclave to a temperature above 150° C.

2. The process which comprises heating an 8-aminoquinoline of the general formula

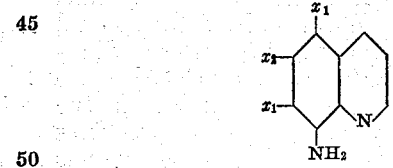

wherein the $x_1$ means H, alkyl, halogen, and $x_2$ means H, alkyl, halogen, hydroxyl, alkoxy, and wherein at least two of the symbols $x_1$, $x_1$, $x_2$ represent hydrogen in an aqueous solution to which alcohol is added in the presence of an acid reacting agent of the group consisting of dilute non-sulfonating sulfuric acid, hydrochloric acid, hydrobromic acid and zinc chloride in an autoclave to a temperature above 150° C.

3. The process which comprises heating 6-methoxy-8-aminoquinoline in an aqueous solution in the presence of an acid reacting agent of the group consisting of dilute non-sulfonating sulfuric acid, hydrochloric acid, hydrobromic acid and zinc chloride in an autoclave to a temperature above 150° C.

4. The process which comprises heating 6-methoxy-8-aminoquinoline in an aqueous solution in the presence of an acid reacting agent of the group consisting of dilute non-sulfonating sulfuric acid, hydrochloric acid, hydrobromic acid and zinc chloride in an autoclave to a temperature of 180 to 190° C.

5. The process which comprises heating 6-methoxy-8-aminoquinoline in an aqueous solution containing about 40% of sulfuric acid in an autoclave to a temperature of 180 to 190° C.

In testimony whereof we have hereunto set our hands.

FRITZ MIETZSCH. [L. S.]
HEINRICH KLÖS. [L. S.]